United States Patent [19]
Howarter et al.

[11] Patent Number: 5,491,659
[45] Date of Patent: Feb. 13, 1996

[54] HAZARD-FREE CIRCUITRY FOR DETERMINING FULL AND EMPTY CONDITIONS IN FIRST-IN-FIRST-OUT MEMORY

[75] Inventors: Dave Howarter, Del Mar; George Wiley, San Diego, both of Calif.

[73] Assignee: Hughes Aircraft Corp., Los Angeles, Calif.

[21] Appl. No.: 372,480

[22] Filed: Jan. 13, 1995

[51] Int. Cl.$^6$ ........................................... G11C 7/00
[52] U.S. Cl. ...................... 365/219; 365/221; 365/236
[58] Field of Search ................................. 365/219, 220, 365/221, 194, 236

[56] References Cited

U.S. PATENT DOCUMENTS

| | | | |
|---|---|---|---|
| 4,873,667 | 10/1989 | Geadah et al. | 365/221 X |
| 4,891,788 | 1/1990 | Kreifels | 365/221 X |
| 5,255,238 | 10/1993 | Ichige et al. | 365/221 X |
| 5,262,996 | 11/1993 | Shiue | 365/221 |
| 5,311,475 | 5/1994 | Huang | 365/221 |

*Primary Examiner*—David C. Nelms
*Assistant Examiner*—Son Dinh
*Attorney, Agent, or Firm*—Gordon R. Lindeen, III; Wanda K. Denson-Low

[57] ABSTRACT

In a first-in-first out memory, at least one data item is stored, and a write counter is incremented in response to the storing of each data item as it is stored into the memory. A full condition counter is also incremented in response to the writing of each data item. The at least one data item is also read from the memory, and a read counter is incremented in response to the reading of each data item from the memory. An empty condition counter is also incremented in response to the reading of each data item from the memory. In order to assure that the empty and full flag signals are not generated simultaneously, the full flag signal is generated in response to a count within the full condition counter that leads a count within the empty condition counter by a first prescribed difference. The empty flag signal is generated in response to the count within the full condition counter lagging the count within the empty condition counter by a second prescribed difference. As a result, the full flag signal and the empty flag signal are never simultaneously generated so long as the full condition counter and the empty condition counter each have at least one more state than the read counter and the write counter.

19 Claims, 4 Drawing Sheets

HAZARD-FREE CIRCUITRY FOR DETERMINING FULL AND EMPTY CONDITIONS IN FIRST-IN-FIRST-OUT MEMORY

BACKGROUND OF THE INVENTION

The present invention relates to electronic memories, and more particularly to electronic first-in-first-out memories. Even more particularly, the present invention relates to hazard-free detection of full and empty conditions in electronic first-in-first-out memories.

Electronic memories are common in the field of digital electronics. Such memories have numerous applications and are numerous in type. A particular application of electronic memories is a first-in-first-out memory, or FIFO memory. Some FIFO memory employ a bank of logic gates clocked by separate load and unload clocks. For example, a FIFO memory is available as Type SN74S225 from Texas Instruments, Inc. of Dallas, Tex. The SN74S225 FIFO memory is packaged in a single integrated circuit chip and holds sixteen words of five bits.

One alternative to the bank-of-logic-gates-type FIFO memory employs random access memory, or RAM. Such RAM-based FIFO memories employ conventional RAM memories, such as those that are used in micro computer or state machine-based devices. Unfortunately, these FIFO memories are susceptible to false indications that they are full or empty, when in fact they are not full or empty, and as a result, often employ means for coordinating (but not necessarily synchronizing) the read and write circuitry used to read and write the binary signals from and to the RAM employed by the RAM-based FIFO memories. Unfortunately, FIFO memories such as the SN74S225 FIFO memory require a significant setup time at each of the gates that comprise the FIFO memory. This setup time, unfortunately, limits the speed with which the FIFO memory can be written or read.

A further problem with FIFO memories such as the SN74S225 FIFO memory is that data must propagate through each of a plurality of sets of latches within the FIFO memory before emerging at the outputs of the FIFO memory. Thus, it can take several clock cycles before data presented at the inputs is available at the outputs, potentially wasting valuable processing time.

Other RAM-based FIFO memories employ additional unused memory locations to assure that read and write pointers of the FIFO memories do not simultaneously point to the same location within the RAM, thus preventing or minimizing the risk of erroneous empty and full conditions at the expense of unused RAM. Finally, some RAM-based FIFO memories dedicate empty and full latches to indicate whether the FIFO memory is empty or full. Unfortunately, such latches are prone to falsely indicating empty or full conditions and to indicating both empty and full conditions simultaneously.

To illustrate this problem, reference is made to FIG. 1, where pointers used with a RAM-based FIFO memory are functionally represented. The FIFO memory has four locations that correspond to the pointer states labelled 0, 1, 2 and 3 as in FIG. 1. A read pointer R is shown pointing to location 0, and a write pointer W is shown transitioning from location 3 to location 0, as would be the case immediately after the last remaining location within the FIFO memory has been written to, i.e., filled. Each time the FIFO memory is written to, the write pointer W advances to the next location, such as is shown in FIG. 1 wherein the write pointer W is transitioning from location 3 to location 0.

As the write pointer W transitions from pointing to location 3 to pointing to location 0 it may pass through an indefinite state, which is caused by unequal delays in the logic circuitry used to implement the write pointer W, e.g., logic circuitry used to implement a write counter. Thus, if an attempt is made to write to the FIFO memory while the write pointer W is transitioning, one of three possibilities exists. First, the write pointer W may be read as pointing to location 0, in which case the FIFO memory should correctly indicate that it is full. However, the location of the write pointer W and the read pointer R, i.e., pointing to location 0, is the same for the full condition as it is for the empty condition. Due to this ambiguity, there is significant risk that the memory will indicate that an empty condition exists or that both an empty and a full condition exist, instead of correctly indicating that a full condition exists. Second, the memory may indicate that the write pointer W is pointing to location 3, in which case there is a risk that information will be written to location 3, overwriting information already stored at location 3. Finally, there is a risk that the write pointer W will point to a meaningless or indeterminate location as the result of its transitioning from location 3 to location 0. In which case, the result is unpredictable.

Referring next to FIG. 2, the RAM-based FIFO memory is again illustrated, having four memory locations labelled 0, 1, 2 and 3 in FIG. 1. The write pointer W is pointing to location 0 and the read pointer R is transitioning from location 3 to location 0. Each time the FIFO memory is read from, the read pointer R advances one state, such as is shown in FIG. 2 wherein the read pointer R is transitioning from location 3 to location 0.

As indicated with the write pointer W in FIG. 1, the read pointer R in FIG. 2 may transition through a meaningless or indeterminate condition before settling to point at location 0. The same three potential problems described in FIG. 1 with respect to the write pointer W, affect the read pointer R in FIG. 2.

Therefore, as can be seen, improvements are needed in the detection of full and empty conditions in FIFO memories.

SUMMARY OF THE INVENTION

The present invention advantageously addresses the needs above as well as other needs by providing a hazard-free full and empty condition detector system and method for use in electronic first-in-first-out memories.

The invention may be characterized as a first-in-first-out buffer including memory means for storing information (or data), having a prescribed number of memory locations in which the data is stored. Such memory means may be discrete multi-bit registers, or may be, e.g., random access memory of the type used, e.g., in conjunction with microprocessors.

A write counter is coupled to the memory means, and includes write pointer means for pointing to a write location within the memory means. The write pointer means points to the location in the memory means to which subsequent data is to be written. The write counter has the prescribed number of states, i.e., the same number of states as the memory means has memory locations, and further includes write pointer incrementing means for incrementing the write pointer means in response to the data being written to the memory means. Thus, each time data is written into the memory means, it is written to a location within the memory means that is pointed to by the write counter, and then the write counter is incremented to point to a next location within the memory means.

A read counter is also coupled to the memory means, and includes read pointer means for pointing to a read location within the memory means. The read location is the location in the memory means from which stored data is to be read. The read counter has the prescribed number of states and further includes read pointer incrementing means for incrementing the read pointer means in response to the data being read from the memory means. Thus, each time data is read from the memory means, it is read from a location within the memory means that is pointed to by the read pointer means, and then the read counter is incremented to point to a next location within the memory means.

An empty condition counter is coupled to the memory means that includes empty pointer means for maintaining an empty pointer count. The empty condition counter has at least one more than the prescribed number of states and further includes means for incrementing the empty pointer means in response to the data being read from the memory means. Similarly, a full condition counter (or full counter) is coupled to the memory means, and includes full pointer means for maintaining a full pointer count. The full condition counter has at least one more than the prescribed number of states and further includes means for incrementing the full pointer means in response to the data being read from the memory means.

In order to assure that empty and full flag signals within the FIFO memory are not simultaneously generated, a full flag generator generates a full flag signal in response to the full pointer count leading the empty pointer count by a first prescribed difference, e.g., leading the empty pointer count by the prescribed number of memory locations. In a similar manner, a empty flag generator generates an empty flag signal in response to the full pointer count lagging the empty pointer count by a second difference, e.g., being equal to the empty pointer count if the second prescribed difference is zero. Thus, unlike in heretofore available FIFO memories, it is not possible for the empty flag signal and the full flag signal of the present invention to be simultaneously generated, because they are generated in response to differing relationships between the full pointer count and the empty pointer count (so long as the first and second prescribed differences are not both zero, which is not possible so long as the full and empty condition counters are capable of assuming at least one more state than the read and write counters).

The invention may also be characterized as a method of generating an empty flag signal and a full flag signal in a first-in-first-out memory, or buffer, wherein the empty and full flag signals are not generated simultaneously. Such method includes storing at least one data item into a memory, and incrementing a write counter in response to the storing of each data item as it is stored into the memory. The data items are stored at a location in the memory to which the write counter points before the incrementing of the write counter. A full condition counter is also incremented in response to the writing of each data item into the memory.

Next, the method includes reading the at least one data items from the memory, and incrementing a read counter in response to the reading of each data item from the memory. The data items are read from a location in the memory to which the read counter points before the incrementing of the read counter. An empty condition counter is also incremented in response to the reading of each data item from the memory.

In order to assure that the empty and full flag signals are not generated simultaneously, the full flag signal is generated in response to a count within the full condition counter that leads a count within the empty condition counter by a first prescribed difference, e.g., the prescribed number of memory locations. In contrast, the empty flag signal is generated in response to the count within the full condition counter lagging the count within the empty condition counter by a second prescribed difference, e.g., zero. As a result, the full flag signal and the empty flag signal are never simultaneously generated.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
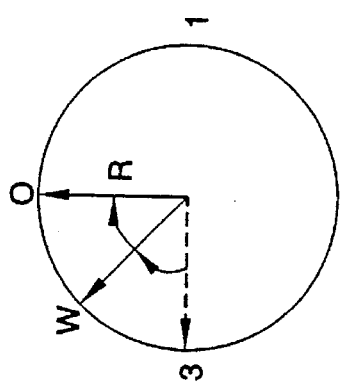
FIG. 1 is a diagram illustrating a write pointer and a read pointer of a FIFO memory, wherein the FIFO memory has just become full.
Figure 2:
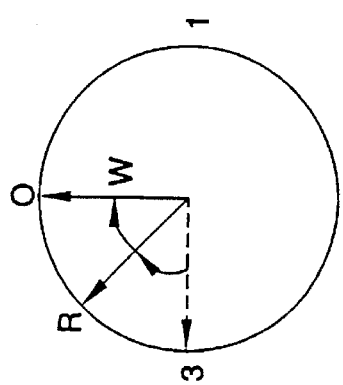
FIG. 2 is a diagram illustrating a write pointer and a read pointer of the FIFO memory of FIG. 1, wherein the FIFO memory has just been emptied.

FIGS. 1 and 2 have been described hereinabove in the background of the invention.

Figure 3:
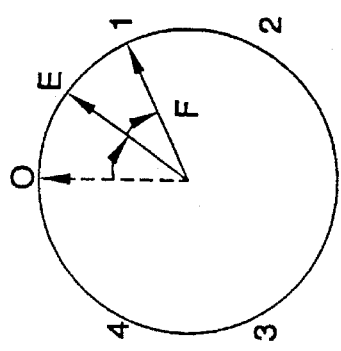
FIG. 3 is a diagram illustrating a write pointer, a read pointer, a full pointer and an empty pointer of a FIFO memory in accordance with one embodiment of the present invention, wherein the FIFO memory has just become full.
Figure 3:
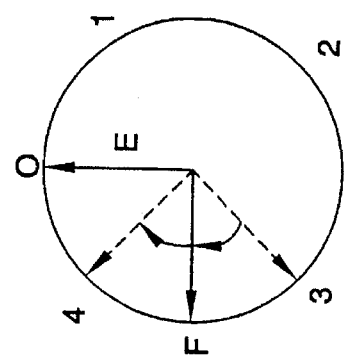
Figure 4:
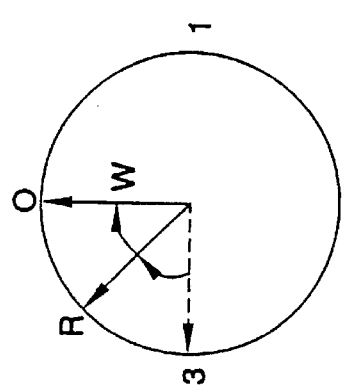
FIG. 4 is a diagram illustrating a write pointer, a read pointer, a full pointer and an empty pointer of the FIFO memory of FIG. 3, wherein the FIFO memory has just been emptied.
Figure 4:
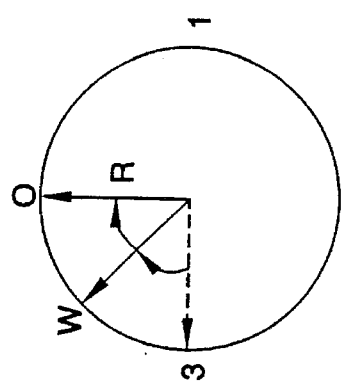

Referring next to FIGS. 3 and 4, a write pointer W, a read pointer R, a full pointer F and an empty pointer E are illustrated. The write pointer W and the read pointer R are shown to the left in FIGS. 3 and 4 and assume one of four possible states. The states correspond to memory locations and are labeled 0, 1, 2 and 3, respectively.

To the right, the full and empty pointers F, E are shown as assuming one or five states labeled 0, 1, 2, 3 and 4, respectively. The five states do not correspond to the memory locations. In operation, the full and empty pointers F, E can be implemented so that they assume any number of states that is greater than the number of memory locations in the FIFO memory, i.e., one or more states than the number of memory locations. As shown, the full and empty pointers F, E assume exactly one state more, i.e., 5, than the number of memory locations in the FIFO memory, i.e., 4, however, this selection is completely arbitrary and by way of example.

Referring to FIG. 3, the write pointer W, and the full pointer F are incremented by one state each time the memory is written to. The location of the write pointer W indicates the next available location within the FIFO memory to which information (or data) can be written, assuming the FIFO memory is not full. The full pointer F signals a full condition whenever it is ahead of, i.e., leads, the empty pointer E by the same number of states as the number of memory locations in the FIFO memory, i.e., when it has been incremented more than the empty pointer E by the number of memory locations. Here, because there are four memory locations in the illustrated embodiment, the full pointer F must be ahead of the empty pointer by four states before the full condition will be indicated.

As shown, the full pointer is transitioning from location 3 to location 4, in which state it will be ahead of the empty pointer E by the same number of states as the number of memory locations in the FIFO memory, i.e., 4. In response to the full pointer F being in front of the empty pointer by a number of states equal to the number of memory locations in the FIFO memory, a full flag signal is generated by the present invention, and further writing to the FIFO memory by the write circuitry is curtailed.

Referring next to FIG. 4, the read pointer R is shown transitioning from location 3 to location 0, and the empty pointer E is shown transitioning from location 0 to location 1, in which state it will be at the same location as the full pointer F shown in FIG. 4. The empty pointer E causes the generation of an empty flag signal whenever it is at the same location as the full pointer F. Thus, as illustrated, the empty flag signal will be generated as soon as the empty pointer's transition is recognized.

In practice, the full and empty pointers F, E of FIGS. 3 and 4 are implemented using error-free (or glitch-free) counters, such as ring counters (a.k.a., Johnson or Moebius counters), Gray code counters, or other unit distance code (UDC) counters. The term "error-free" or "glitch-free" counters is used herein to mean a counter with outputs that do not pass through an intermediate state when transitioning from one count to another. As a result, the full and empty pointers F, E do not pass through an indefinite state while transitioning from one location to the next, and thus avoid transitional errors (or flashing). Thus, when the full and empty pointers F, E are examined during their transition, they will indicate only two possible conditions, i.e., pointing to either the one location or the next.

Because however, the full pointer F is incremented only when the write pointer W is incremented, and because the full flag signal is asserted in response to the full pointer being ahead of the empty pointer by the number of memory locations, the possibility exists that the full flag will not be set immediately when the last available memory location within the FIFO memory is filled. Instead, there may be some propagation delay inherent in the circuitry used to implement the present invention that causes a delay in the setting (or asserting) of the full flag signal, i.e., "late" setting of the full flag signal. This problem, however, can be easily remedied by selecting FIFO circuitry that is sufficiently fast to set the full flag signal before the FIFO memory can be written to again, or by building a sufficient fixed delay into the write circuitry that writes information into the FIFO memory.

On the other hand, because the empty pointer E is incremented only when the read pointer R is incremented, and because the full flag signal is asserted in response to the full pointer F being ahead of the empty pointer E by the number of memory locations, the possibility exists that the full flag signal will not be reset immediately when a memory location is made available within the FIFO memory. This, however, does not pose a serious problem, even though the write circuitry may have no way of determining when the empty pointer E will be done transitioning (as it is able to do through the suitable fixed delay, with the full pointer F). The effect of the full pointer's "late" resetting will merely be a slight delay in the write circuitry being able to write information into the FIFO memory while the empty pointer E completes its transition.

Similarly, the empty pointer E is incremented only when the read pointer R is incremented, and because the empty flag signal is asserted in response to the empty pointer being at the same location as the full pointer, the possibility exists that the empty flag signal will not be set (or asserted) immediately when the last information-containing memory location within the FIFO memory is emptied (read from). Instead, there may be some propagation delay inherent in the circuitry used to implement the present invention that causes a delay in the setting of empty flag signal, i.e., "late" setting of the empty flag signal. This problem, however, can be easily remedied by selecting FIFO circuitry that is sufficiently fast to set the empty flag before the FIFO memory can be read from again, or by building a sufficient fixed delay into the read circuitry that reads information from the FIFO memory.

On the other hand, because the full pointer F is incremented only when the write pointer W is incremented, and because the empty flag signal is asserted in response to the empty pointer being at the same location as the full pointer, the possibility exists that the empty flag signal will not be reset immediately when a memory location is written to within the FIFO memory. This, however, does not pose a serious problem, even though the read circuitry may have no way of determining when the full pointer F will be done moving (as it is able to do through the suitable fixed delay with the empty pointer E), because the effect of the empty pointer's "late" resetting will merely be a slight delay in the read circuitry being able to read information from the FIFO memory while the full pointer F completes its transition.

Figure 5A:
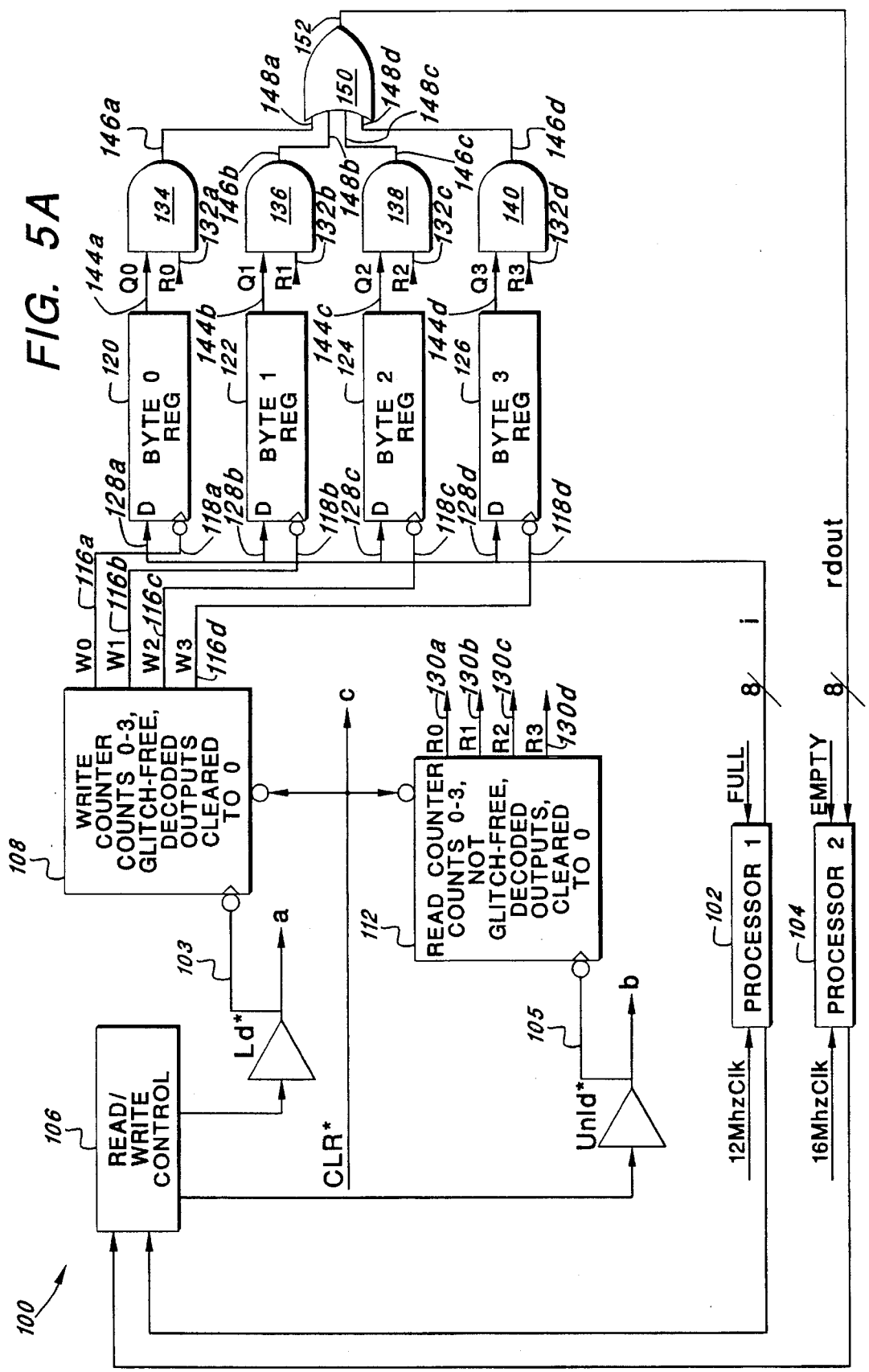
FIGS. 5A and 5B are a schematic block diagram illustrating one embodiment of the present invention, which employs the pointers of FIGS. 3 and 4.
Figure 5B:
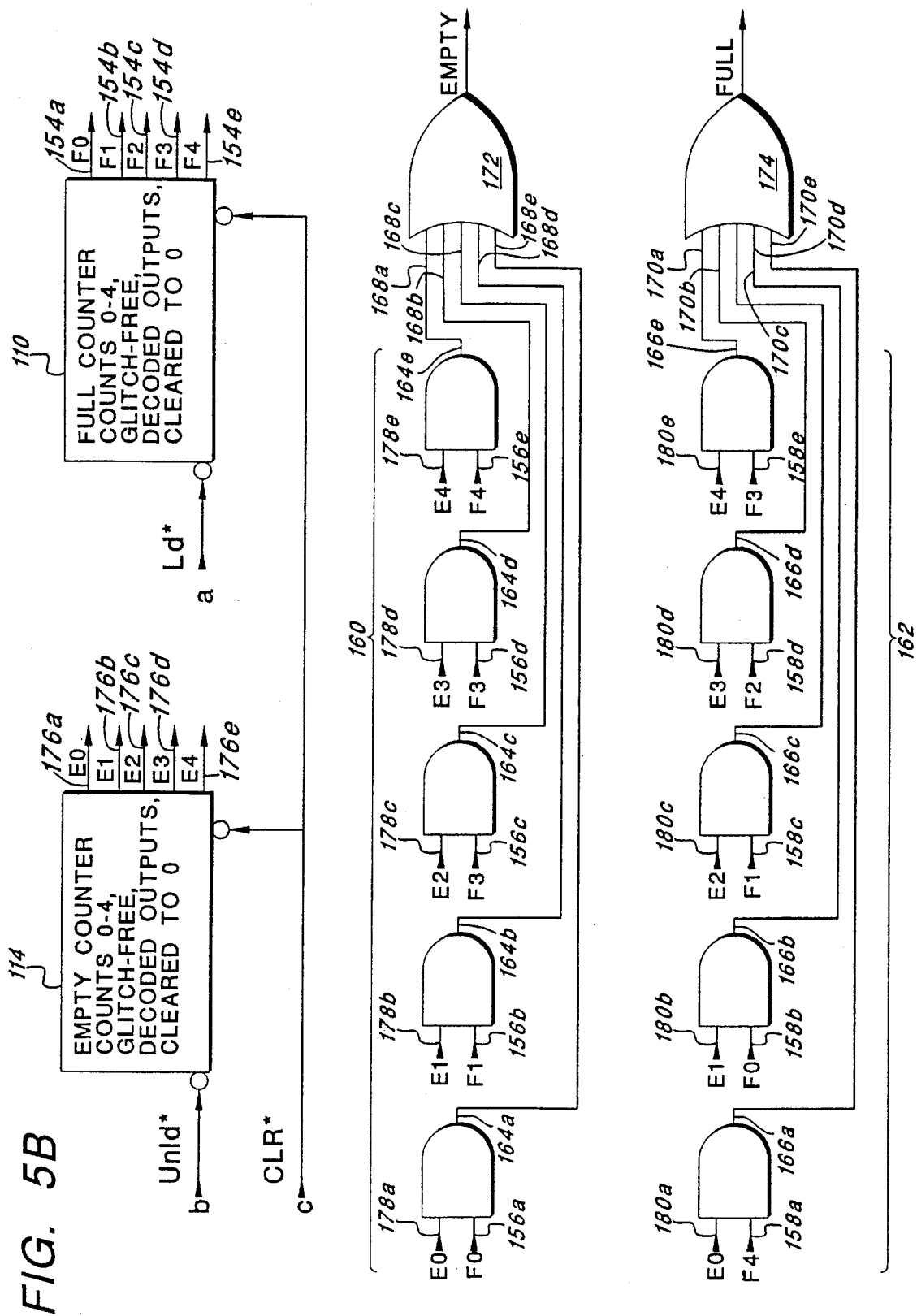

It should be understood that several possible embodiments and variations thereof exist to carry out the teachings of the present invention. One such embodiment is described above in reference to FIGS. 3 and 4, and below in reference to FIGS. 5A, 5B and 6. Table 1 outlines several variations of the one embodiment.

TABLE 1

| | Possible Designs | | | | | | | | |
| | I | | II | | III | | IV | | V | |
| | F | E | F | E | F | E | F | E | F | E |
| Empty | 0 | 0 | 0 | 1 | 0 | 2 | 0 | 3 | 0 | 4 |
| 1 | 1 | 0 | 1 | 1 | 1 | 2 | 1 | 3 | 1 | 4 |
| 2 | 2 | 0 | 2 | 1 | 2 | 2 | 2 | 3 | 2 | 4 |
| 3 | 3 | 0 | 3 | 1 | 3 | 2 | 3 | 3 | 3 | 4 |
| Full | 4 | 0 | 4 | 1 | 4 | 2 | 4 | 3 | 4 | 4 |
| 3 | 4 | 1 | 4 | 2 | 4 | 3 | 4 | 4 | 4 | 0 |
| 2 | 4 | 2 | 4 | 3 | 4 | 4 | 4 | 0 | 4 | 1 |
| 1 | 4 | 3 | 4 | 4 | 4 | 0 | 4 | 1 | 4 | 2 |
| Empty | 4 | 4 | 4 | 0 | 4 | 1 | 4 | 2 | 4 | 3 |

Table 1 is divided into five pairs of two columns per pair. The pairs of columns represent the counts within full and empty counters. The rows of the table represent one possible set of states for such counts as they are incremented when the FIFO memory is first empty, then filled, one location at a time, and then emptied again, one location at a time. Specifically, with reference to the first pair of columns I, the full counter begins in state 0, is incremented through states 1, 2, and 3, as the FIFO memory is filled, and reaches state 4 when the last available location within the FIFO memory is filled.

As described above with reference to FIGS. 3 and 4, the empty condition is indicated when the full counter and the empty counter are in the same state. Thus, because initially, the full counter and empty counter (in Table 1, Column I) are both in state 0, the empty condition is indicated. As also described above, the full condition is indicated when the full counter leads the empty counter by a number of states equal to the number of memory locations. Thus, because in the illustrated embodiment there are four states, the full condition is indicated when the full counter leads the empty counter by four states. Specifically, the full condition is indicated in the first pair of columns I of Table 1 when the full counter is in state 4 and the empty counter is in state 0.

As illustrated in Table 1, after the FIFO memory is filled, it is emptied. As the FIFO memory is emptied, the empty counter is incremented from state 0 through states 1, 2 and 3. When the empty counter reaches state 4, it is again equal to the full counter, having been incremented during the filling of the FIFO memory. As a result, the empty condition is again indicated.

Note that the filling and emptying shown in Table 1 is merely illustrative. It should be understood that it is not necessary to fill then empty the FIFO memory. Instead, information, i.e., data, can be read from and written to the FIFO memory in any sequence, with the limitation that data should not be read from the FIFO memory when the empty condition is indicated, and that data should not be written to the FIFO memory when the full condition is indicated. Thus, exemplary operation of the embodiment of the invention described in the figures is shown in the first pair of columns I of Table 1.

The pairs of columns labeled II through V illustrate possible variations of the embodiment shown in the figures. For example, in the second pair of columns II, the empty condition is signalled when state of (or count in) the empty counter leads the state of (or count in) the full counter by one state. The full condition is indicated when the state of the full counter leads the state of the empty counter by one less than the number of memory locations, i.e., 3. Other possible variations are shown in the pairs of columns labeled III, IV and V.

Generally, the full and empty conditions are signalled as follows:

full: $F=E+(y-x)$, empty: $E=F+x$, wherein E is the state of the empty counter, F is the state of the full counter, y is an integer having a value equal to the number of memory locations in the FIFO memory, and x is an integer having a value from 0 to y (the number of memory locations in the FIFO memory). Note that the above relationships are independent of the number of states that can be assumed by the full and empty counters, but that the full and empty counters must be able to assume at least one more state than the number of memory locations in order for the full and empty conditions to be unique from each other. In Table 1, y=4, and in the first pair of columns I, x=0, in the second pair of columns II, x=1, in the third pair of columns, x=2, etc.

Referring next to FIG. 5, a schematic block diagram is shown illustrating one embodiment of the FIFO memory 100 of the present invention. The write circuitry 102 is shown as a first processor, and the read circuitry 104 is shown as a second processor. By way of example, the first processor is illustrated as being clocked by a 12 MHz clock, and the second processor is shown as being clocked by a 16 MHz clock. It should be understood, however, that the selection of such clocks is merely for purposes of illustrating that the present invention works equally well with a synchronous read and write circuitry, as with synchronous circuity. Furthermore, it should be understood that the read and write circuity need not be processors, but can instead be any circuity capable of reading and writing information from/to the FIFO memory, respectively.

Coupled to clock inputs 103, 105 of the read and write circuitry is a read/write control logic device 106, such as a PAL or a ROM. The read/write control logic device 106 controls the generation of a load signal (or Ld signal), and an unload signal (or Unld signal), which clock the write counter 108 and the read counter 112, respectively, whenever the read or write circuitry 104, 102, respectively, request or send information to/from the FIFO memory 10. The write counter 108 and full counter 110 (or full condition counter) are coupled to the read/write control logic device 106, and receive the load signal therefrom. Similarly, the read counter 112 and empty counter 114 (or empty condition counter) are coupled to the read/write control logic device 106, and receive the unload signal therefrom. A clear signal (CLR signal) can also be coupled to the read, write, empty, and full counters 112, 108, 114, 110 and can be used to clear all of the counters simultaneously, thereby effectively clearing the FIFO memory, and establishing an empty condition.

As illustrated, the counters 108, 110, 112, 114 are ring counters, with outputs of the counters 108, 110, 112, 114 being decoded outputs. Outputs 116a, 116b, 116c, 116d of the write counter 108 are coupled to clock inputs 118a, 118b, 118c, 118d of each of four eight bit registers 120, 122, 124, 126, or memories.

As the write counter 108 is clocked by the read/write control logic 106, a count within the write counter 108 is incremented, as is known in the art. The count is represented on the outputs 116a, 116b, 116c, 116d of the write counter 108 as a series of binary signals, which clock the eight bit registers 120, 122, 124, 126, as is known in the art. Data inputs 128a, 128b, 128c, 128d of each of the eight bit registers 120, 122, 124, 126 are coupled to the first processor 102 (write circuitry) and receive information therefrom in the form of binary signals. The information is read into the data inputs 128a, 128b, 128c, 128d of one of the eight bit registers 120, 122, 124, 126 as determined by the count within the write counter 108. When the count is incremented, information is read into another, i.e., a next, of the eight bit registers 120, 122, 124, 126.

Outputs 130a, 130b, 130c, 130d of read counter are coupled, respectively, to a first input 132a, 132b, 132c, 132d of each AND gate in four sets of AND gates 134, 136, 138, 140. (Note that for illustration purposes, each of the four sets of AND gates 134, 136, 138, 140 is shown as a single AND gate in FIG. 5. In practice, however, each of the four sets will contain one AND gate for each bit in the eight-bit registers 120, 122, 124, 126, i.e., in this case, eight). A second input 142a, 142b, 142c, 142d of each AND gate in the four sets of AND gates 134, 136, 138, 140 is coupled to each of a set of outputs 144a, 144b, 144c, 144d of each of the eight-bit registers 120, 122, 124, 126. When the eight-bit registers 120, 122, 124, 126 are used (as opposed to, e.g., sixteen-bit registers), eight AND gates make up each of the four sets 134, 136, 138, 140, and each eight-bit register 120, 122, 124, 126 has eight outputs 144a, 144b, 144c, 144d, each of which are coupled to the second input 142a, 142b, 142c, 142d of respective ones of the eight AND gates in each of the four sets of AND gates 134, 136, 138, 140. Coupled to each of the four eight-bit registers 120, 122, 124, 126 are respective ones of the four groups of AND gates 134, 136, 138, 140.

As the read counter 112 is incremented, the first inputs 132a, 132b, 132c, 132d of each of the four groups of AND gates 134, 136, 138, 140 are sequentially asserted, thereby permitting the binary signal present at the outputs 144a, 144b, 144c or 144d of the eight bit register 120, 122, 124 or 126 that is coupled to the second input 142a, 142b, 142c or 142d of the selected group of AND gates 134, 136, 138 or 140 to pass through to outputs 146a, 146b, 146c or 146d of the selected group of AND gates 134, 136, 138 or 140.

The outputs 146a, 146b, 146c, 146d of each of the groups of AND gates are coupled to respective inputs 148a, 148b, 148c, 148d of each of a group of four-input OR gates 150, so that the binary signal present at the outputs of the selected group of AND gates 134, 136, 138 or 140 are passed through the group of OR gates 150. The outputs 152 of the group of OR gates 150 are coupled to respective inputs of the second processor 104 (read circuitry). As with the groups of AND gates 134, 136, 138, 140, the group of OR gates 150 contains eight OR gates (when the eight bit registers 120, 122, 124, 126 are utilized).

In practice, the full counter 110 is also a ring counter, and like the write counter 108, is incremented by the load signal. Each output 154a, 154b, 154c, 154d, 154e of the full counter 110 is coupled to respective first inputs 156a, 156b, 156c, 156d, 156e, 158a, 158b, 158c, 158d, 158e of each of two groups 160, 162 of AND gates, and each of the groups 160, 162 of AND gates is coupled at their outputs 164a, 164b, 164c, 164d, 164e, 166a, 166b, 166c, 166d, 166e to an input 168a, 168b, 168c, 168d, 168e, 170a, 170b, 170c, 170d, 170e of a respective one of two OR gates 172, 174.

The empty counter is similarly configured with each of its outputs 176a, 176b, 176c, 176d, 176e being coupled to respective second inputs 178a, 178b, 178c, 178d, 178e, 180a, 180b, 180c, 180d, 180e of each of the two groups of AND gates 160, 162.

Within the first group of AND gates 160, the outputs 176a, 176b, 176c, 176d, 176e of the empty counter 114 are coupled to the AND gate to which a corresponding output 154a, 154b, 154c, 154d, 154e of the full counter 110 is coupled, such that when corresponding outputs 154a and 176a, 154b and 176b, 154c and 176c, 154d and 176d or 154e and 176e of the full and empty counters 110, 114 assume an asserted state, the output of one of the first group 160 of AND gates, and in turn the output of the first OR gate 172 becomes asserted. The binary signal present at the output of first OR gate 172 is the empty flag signal, and such output is coupled to the second processor 104.

Within the second group of AND gate 162, each output 176a, 176b, 176c, 176d or 176e of the empty counter 114 is coupled to the AND gate to which an output 154a, 154b, 154c, 154d or 154e of the full counter 110 leading the respective output 176a, 176b, 176c, 176d or 176e of the empty counter 114 by four is coupled. The number four corresponds to the number of memory locations, i.e., eight bit registers 120, 122, 124, 126 in the FIFO memory 100. Thus, the outputs 154a and 176b, 154b and 176c, 154c and 176d, 154d and 176c, and 154e and 176a are coupled to respective AND gates in the second group 162 of AND gates. As a result, when one or the output of the full counter 110 is asserted that leads the asserted output 176a, 176b, 176c, 176d or 176e of the empty counter 114 by four, the output 166a, 166b, 166c, 166d or 166e the second group 162 of AND gates, and in turn the output of the second OR gate 174, becomes asserted. The signal present at the output of second OR gate 174 is the full flag signal, and such output is coupled to the first processor 102. In this way, the full and empty flag signals are generated without the problems and hazards present in heretofore known FIFO memories.

Figure 6:
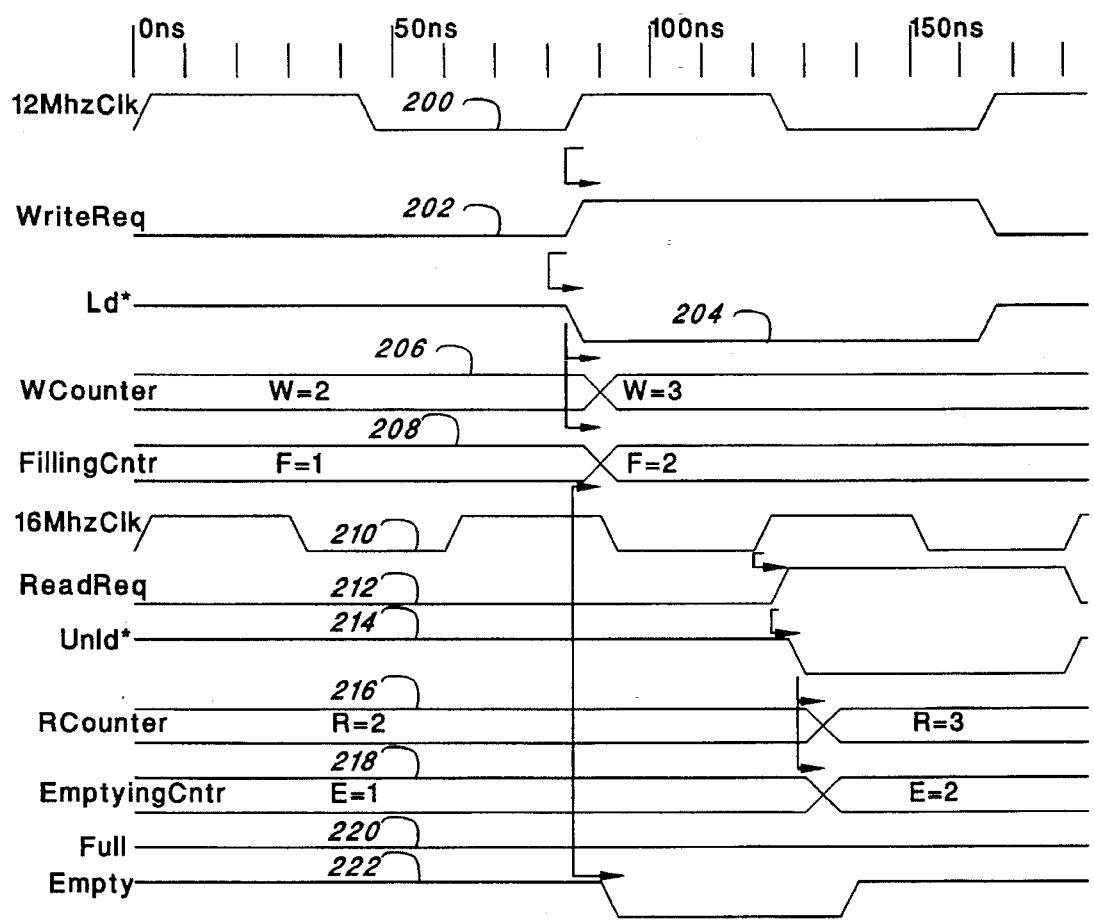
FIG. 6 is a timing diagram showing the timing of various signals used in the embodiment of FIGS. 5A and 5B.

Referring first to FIG. 6, a timing diagram is shown of the timing of various signals used in the herein described embodiment. A first signal 200 shown is a 12 MHz clock signal that is utilized by the first processor (write circuitry) to clock the first processor at 12 MHZ, as mentioned above. Second, a write request signal 202 is shown, which is asserted by the first processor whenever the first processor has information at its outputs that is to be written into the FIFO memory. The write request signal is passed to the read/write control logic and is used to generate the load signal 204, described above and shown in FIG. 6.

Next, a write count signal 206 generated within the write counter is represented, with the count shown as being incremented from W=2 to W=3, i.e., location or state 2 to location or state 3, upon the writing of information to the FIFO memory. Below the count signal 206, a full count signal 208 generated within the full counter is represented as transitioning from F=1 to F=2, i.e., location or state 1 to location or state 2, simultaneously with the incrementing of the write counter.

A 16 MHZ clock signal 210 is next represented, as is used to clock the second processor (read circuitry). Below the 16 MHZ clock signal 210, a read request signal 212 is represented. The read request signal 212 is passed to the read/write logic device, and is used by the read/write logic device to generate the unload signal 214, which is represented in FIG. 6 below the read request signal 212. Below the unload signal 214, a read count signal 216 generated within the read counter is represented. The count within the read counter is shown as being incremented from R=2 to R=3, i.e., location or state 2 to location or state 3, upon the reading of information from the FIFO memory. Simultaneous with the incrementing of the count within the read counter, the count within the empty counter is incremented from E=1 to E=2, as is represented in an empty count signal 218 generated within the empty counter.

Finally, the full and empty flag signals 220, 222 are represented on the next two lines of the timing diagram of FIG. 6. Under the conditions shown in FIG. 6, the full flag signal 220 remains not asserted, or "false" for the entire period of time shown in FIG. 6 The empty flag signal 222, however, becomes asserted, or "true", in response to the full and empty counters assuming the same state, i.e., in response to, e.g., the count within the full counter being F=1 and the count within the empty counter being E=1. When the full and empty counters are not in the same state, e.g., when the count within the full counter is F=2 and the count within the empty counter is E=1, the empty flag signal becomes not asserted, or "false". (Note that as shown, the full and empty flag signals are asserted when they assume a higher voltage and are not asserted when they assume a lower voltage). In this way, the empty flag signal is accurately generated free from the problems and hazards described above. In a similar manner, not illustrated in FIG. 6, the full flag signal is asserted whenever the count within the full counter leads the count within the empty counter by the number of memory locations in the FIFO memory, i.e., four in the embodiment of FIGS. 5A and 5B. Such occurs, for example, when E=0 and F=4. Thus, both the empty and full flag signals are generated free from the problems and hazards described above.

While the invention herein disclosed has been described by means of specific embodiments and applications thereof, numerous modifications and variations could be made thereto by those skilled in the art without departing from the scope of the invention set forth in the claims.

What is claimed is:

1. A first-in-first-out memory including:

a memory for storing data, the memory having a prescribed number of memory locations to which the data can be written and from which the data can be read;

a write counter coupled to the memory, the write counter including write pointer means for pointing to a write location within the memory to which subsequent data is to be written, the write counter being capable of assuming the prescribed number of states and further including write pointer incrementing means for incrementing the write pointer means in response to the data being written to the memory;

a read counter coupled to the memory, the read counter including read pointer means for pointing to a read location within the memory from which stored data is to be read, the read counter being capable of assuming the prescribed number of states and further including read pointer incrementing means for incrementing the read pointer means in response to the data being read from the memory;

an empty condition counter coupled to the memory, the empty condition counter including empty pointer means for maintaining an empty pointer count, the empty condition counter being capable of assuming at least one more than the prescribed number of states and further including means for incrementing the empty pointer means in response to the data being read from the memory;

a full condition counter coupled to the memory, the full condition counter including full pointer means for maintaining a full pointer count, the full condition counter being capable of assuming at least one more than the prescribed number of states and further including means for incrementing the full pointer means in response to the data being written to the memory; and full flag generator means for generating a full flag signal in response to the full pointer count leading the empty pointer count by a first prescribed difference.

2. The first-in-first-out memory of claim 1 including:

empty flag generator means for generating an empty flag signal in response to said empty pointer count leading said full pointer count by a second prescribed difference, said first prescribed difference and the second prescribed difference not both being zero;

whereby said full flag signal and the empty flag signal are not simultaneously generated.

3. The device of claim 2 wherein:

said full flag generator means includes means for determining the first prescribed difference by subtracting said second prescribed difference from a prescribed offset, the prescribed offset being equal to said prescribed number of memory locations, said seemed prescribed difference being from zero to said prescribed number of states.

4. The device of claim 3 wherein said memory includes at least four memory locations to which data can be written and from which data can be read.

5. The device of claim 4 wherein said memory includes at least one eight-bit register for each memory location.

6. The device of claim 2 wherein said full condition counter and said empty condition counter are glitch-free counters.

7. The device of claim 6 wherein said write counter and said read counter are glitch-free counters.

8. In a first-in-first-out buffer, a method of generating a full flag signal, the method including:

storing at least one data item into a memory;

incrementing a write counter in response to the storing of each of the at least one data items in the memory, the storing being at a location in the memory to which the write counter points;

incrementing a full condition counter in response to the storing of each of the at least one data items in the memory;

reading the at least one data items from the memory;

incrementing a read counter in response to the reading of each of the at least one data items from the memory, the reading being at a location in the memory to which the read counter points;

incrementing an empty condition counter in response to the reading of each of the at least one data items from the memory; and generating a full flag signal in response a count within the full condition counter leading a count within the empty condition counter by a first prescribed difference.

9. The method of claim 8 including:

generating an empty flag signal in response to said count within said empty condition counter leading said count within said full condition counter by a second prescribed difference, said first prescribed difference and said second prescribed difference not both being zero;

whereby said full flag signal and said empty flag signal are not simultaneously generated.

10. The method of claim 9 including:

determining the first prescribed difference by subtracting the second prescribed difference from a prescribed offset, the prescribed offset being equal to a number of memory locations in said memory, the second prescribed difference being from zero to the prescribed number of states.

11. The method of claim 10 wherein said storing includes storing said at least one data item into an eight-bit register, and wherein said reading includes reading said data item from the eight-bit register.

12. The method of claim 11 wherein:

said incrementing said write counter includes incrementing a first digital counter, the first digital counter being capable of assuming said prescribed number of states;

said incrementing said full condition counter includes incrementing a first glitch-free counter, the first glitch-free counter being capable of assuming at least one more than said prescribed number of states;

said incrementing said read counter includes incrementing a second digital counter, the second digital counter being capable of assuming said prescribed number of states; and said incrementing said empty condition counter includes incrementing a second glitch-free counter, the second glitch-free counter being capable of assuming at least one more than said prescribed number of states.

13. A first-in-first-out memory including:

a memory for storing data, the memory having a prescribed number of memory locations to which the data can be written and from which the data can be read;

a write counter coupled to the memory, the write counter including write pointer means for pointing to a write location within the memory to which subsequent data is to be written, the write counter being capable of assuming the prescribed number of states and further including write pointer incrementing means for incrementing the write pointer means in response to the data being written to the memory;

a read counter coupled to the memory, the read counter including read pointer means for pointing to a read location within the memory from which stored data is to be read, the read counter being capable of assuming the prescribed number of states and further including read pointer incrementing means for incrementing the read pointer means in response to the data being read from the memory;

an empty condition counter coupled to the memory, the empty condition counter including empty pointer means for maintaining an empty pointer count, the empty condition counter being capable of assuming at least one more than the prescribed number of states and further including means for incrementing the empty pointer means in response to the data being read from the memory;

a full condition counter coupled to the memory, the full condition counter including full pointer means for maintaining a full pointer count, the full condition counter being capable of assuming at least one more than the prescribed number of states and further including means for incrementing the full pointer means in response to the data being written to the memory; and empty flag generator means for generating an empty flag signal in response to the empty pointer count leading the full pointer count by a first prescribed difference.

14. The first-in-first-out memory of claim 13 including:

full flag generator means for generating a full flag signal in response to said full pointer count leading said empty pointer count by a second prescribed difference, said first prescribed difference and the second prescribed difference not both being zero;

whereby said full flag signal and the empty flag signal are not simultaneously generated.

15. The device of claim 14 wherein:

said full flag generator means includes means for determining the second prescribed difference by subtracting said first prescribed difference from a prescribed offset, the prescribed offset being equal to said prescribed number of memory locations, the second prescribed difference being from zero to said prescribed number of states.

16. The device of claim 14 wherein said full condition counter and said empty condition counter are glitch-free counters.

17. In a first-in-first-out buffer, a method of generating an empty flag signal, the method including:

storing at least one data items into a memory;

incrementing a write counter in response to the storing of each of the at least one data items in the memory, the storing being at a location in the memory to which the write counter points;

incrementing a full condition counter in response to the storing of each of the at least one data items in the memory;

reading the at least one data items from the memory;

incrementing a read counter in response to the reading of each of the at least one data items from the memory, the reading being at a location in the memory to which the read counter points;

incrementing an empty condition counter in response to the reading of each of at least one data items from the memory; and generating an empty flag signal in response a count within the empty condition counter leading a count within the full condition counter by a first prescribed difference.

18. The method of claim 17 including:

generating a full flag signal in response to said count within said full condition counter leading said count within said empty condition counter by a second prescribed difference, said first prescribed difference and said second prescribed difference not both being zero;

whereby said full flag signal and said empty flag signal are not simultaneously generated.

19. The method of claim 18 including:

determining the second prescribed difference by subtracting the first prescribed difference from a prescribed offset, the prescribed offset being equal to a number of memory locations in said memory, the first prescribed difference being from zero to the prescribed number of states.

* * * * *